Patented Sept. 2, 1941

2,254,267

UNITED STATES PATENT OFFICE 2,254,267

METHOD OF PRESERVING LATEX AND PRODUCT

Thomas S. Carswell, Kirkwood, Mo., assignor to Monsanto Chemical Company, St. Louis, Mo., a corporation of Delaware No Drawing. Application June 20, 1938, Serial No. 214,777

7 Claims. (Cl. 260—820)

This invention relates to a method of preserving latex and to the product so obtained.

Latex when obtained from the rubber trees tends to coagulate in a relatively short time and, even where it is to be promptly converted into crude rubber on the plantation, it is necessary to add a preservative to prevent natural coagulation. Where the latex is to be preserved for a longer period, as for instance when it is to be shipped long distances, it is especially necessary to employ effective means of preservation. Many preservative substances are known which vary in efficiency, cost and in the qualities imparted to the latex, the one most commonly used being ammonia. Formaldehyde has been used to some extent and the rubber from such treated latex, when spray dried, has excellent milling properties, but when formaldehyde is used it renders the cost excessive and it is not efficient for preserving latex for extended periods of time, as when shipped to other countries, since the latex under such conditions tends to thicken.

An object of this invention is to provide a cheap and efficient method of preserving latex for desired periods of time without appreciable change in its consistency.

Another object is to provide a cheap stable latex of uniform consistency over varying periods of time.

Other objects will be hereinafter shown.

The invention relates broadly to the adding to latex as a preservative thereof a relatively small quantity of a tetra chlor or a penta chlor phenol. While the compounds of this invention may be incorporated in latex in the form of the free phenols, due to their relative insolubility in water, it is generally more desirable to employ these materials in the form of their water-soluble or dilute alkali-soluble salts. Obviously mixtures of the several substances may be employed where convenient or desirable. The lower chlorinated phenols have been heretofore found to be of little use as a preservative for latex. Thus, tri chlor phenol as well as the mono and di chlor phenols are not satisfactory, but it has now been found according to the present invention that the more highly chlorinated phenols and preferably their water-soluble and dilute alkali-soluble salts are highly efficient preservatives of latex. More specifically the alkali metal and ammonium salts of tetra chlor phenol and penta chlor phenol are preferred. This surprising discovery is particularly useful in view of the relative cheapness of chlorinated phenols. The proportion of the preferred class of materials required to stabilize latex is very small even where the latex is to be shipped long distances. For example 0.2% to 0.75% of the sodium salt of penta chlor phenol, based on the weight of the latex, has been conveniently and successfully employed. Phenol itself, when used in small proportions, exhibits some preservative qualities, but larger proportions coagulate latex and care must be exercised in its use.

In the employ of the preferred class of latex preservatives it has been found that they function most desirable in conjunction with very small concentrations of ammonia. Such amounts of ammonia are, however, only small fractions of that required to preserve the latex when the ammonia is employed alone as the stabilizer. Thus, while in normal commercial practice it is customary to employ up to about 1.25% ammonia (based upon the weight of the latex) when using ammonia as the sole preservative, extremely satisfactory results are obtained according to this invention by the conjoint use of between about 0.3% and 0.75% of a water-soluble or dilute alkali-soluble salt as above defined with about 0.07% of ammonia. The amount of said salt employed in any given case depends upon the amount of ammonia used, the larger the amount of ammonia used the less of the salt is required. When no ammonia is added, the quantity of salt employed is usually to be greater than 0.75%, being preferably between 1 and 2%.

In the preparation of latex compositions for adhesive and other purposes, particularly compositions including such materials as gum karaya, gum tragacanth, starch, sugar, milk, casein, etc., it is advantageous to add some material to prevent putrefaction. Such compositions are susceptible to bacterial decay, for example milk, which is sometimes an ingredient of latex compositions is an example of a material which everyone knows will undergo putrefaction. Ammonia has no antiseptic value in such compositions and there is some doubt as to whether it does prevent bacterial decomposition of uncompounded latex. The preferred compounds of the present invention effectively prevent bacterial decomposition of uncompounded latex.

As a specific example of the useful preservative properties of the preferred class of materials 0.2% by weight of the sodium salt of penta chlor phenol, based on the weight of the latex, was incorporated into fresh latex having a total solids content of substantially 40% into which was also incorporated 0.08% of ammonia. After shipment the latex was held in storage for several months, during which time the latex was carefully examined at intervals for any signs of coagulation or putrefaction. At the end of seven months there was no sign of coagulation, and there was no change in color or odor from that when originally prepared for shipment. On vulcanization of the latex aged as described, a perfectly normal vulcanized rubber product was obtained.

As further specific embodiments of this invention, the preferred compounds, for example the sodium salt of penta chlor phenol, has been employed in centrifugal concentrate containing 60% dry rubber and in creamed latex containing 53% dry rubber, in concentrations varying between 0.1% to 0.3% based on the latex, and found to exhibit good stabilization properties.

It is thus seen that in accordance with this invention a method of preserving latex has been provided which is relatively cheap, and one which has relatively no effect on the final vulcanized rubber product.

In place of the sodium salt specifically shown in the examples, water-soluble salts and dilute alkali-soluble salts of tetra chlor and penta chlor phenols generally are included within the scope of this invention. Thus, for example, I may employ the potassium, ammonium, barium, calcium and like salts. This invention is limited only by the claims attached hereto.

This application is a continuation in part of my co-pending application Serial No. 205,028, filed April 29, 1938.

What is claimed is:

1. Latex having incorporated therein as a preservative a small proportion of ammonia and from 0.3% to 0.75% of sodium penta chlor phenate.

2. A vulcanized rubber product derived from latex preserved with a small proportion of ammonia and from 0.3% to 0.75% of sodium penta chlor phenate.

3. Latex having incorporated therein as a preservative at least 0.2% of chlorinated phenol containing more than three chlorine atoms in conjunction with at least 0.07% of ammonia.

4. Latex having incorporated therein as a preservative at least 0.2% of a water soluble penta chlor phenate in conjunction with at least 0.07% of ammonia.

5. Latex having incorporated therein as a preservative about 0.07% of ammonia and from 0.3% to 0.75% of sodium penta chlor phenate.

6. A rubber product derived from latex preserved with at least 0.2% of a water soluble penta chlor phenate in conjunction with at least 0.07% of ammonia.

7. Latex having incorporated therein as a preservative at least 0.07% ammonia, the amount being only a fraction of that required to preserve the latex by ammonia alone and a water soluble penta chlor phenate in an amount sufficient to provide an effectively preserved latex.

THOMAS S. CARSWELL.